US005237502A

United States Patent [19]

White et al.

[11] Patent Number: 5,237,502

[45] Date of Patent: Aug. 17, 1993

[54] METHOD AND APPARATUS FOR PARAPHRASING INFORMATION CONTAINED IN LOGICAL FORMS

[75] Inventors: Brian F. White, Yorktown, N.Y.; Ivan P. Bretan; Mohammad A. Sanamrad, both of Lidingo, Sweden

[73] Assignee: International Business Machines Corporation, Armonk, N.Y.

[21] Appl. No.: 750,169

[22] Filed: Aug. 26, 1991

[30] Foreign Application Priority Data

Sep. 4, 1990 [SE] Sweden ............ 90850295

[51] Int. Cl.[5] ............ G06F 15/38

[52] U.S. Cl. ............ 364/419.01; 364/DIG. 1; 364/DIG. 2

[58] Field of Search ............ 364/419, 200 MS File, 364/900 MS File

[56] References Cited

U.S. PATENT DOCUMENTS

| | | | |
|---|---|---|---|
| 4,688,195 | 3/1989 | Thompson et al. | 364/300 |
| 4,816,994 | 3/1989 | Freiling et al. | 364/200 |
| 4,829,423 | 5/1989 | Tennant et al. | 364/286.2 |

FOREIGN PATENT DOCUMENTS

| | | |
|---|---|---|
| 0168814 | 1/1986 | European Pat. Off. . |
| 2096374 | 10/1982 | United Kingdom . |

OTHER PUBLICATIONS

IBM Journal of Research & Development, vol. 32, No. 1, Mar. 1988, pp. 251-267; P. Velardi et al., "Conceptual Graphs for the Analysis and Generation of Sentences". ICL Technical Journal, vol. 5, No. 4, Nov. 1987, B. T. Lowden, et al, "A General Purpose Natural Language Interface: Design and Application as A Database Front End".

*Primary Examiner*—Robert A. Weinhardt
*Assistant Examiner*—Frantzy Poinvil
*Attorney, Agent, or Firm*—Joseph C. Redmond, Jr.; Lauren C. Bruzzone

[57] ABSTRACT

A computer implemented system creates natural language paraphrases of information contained in a logical form, where the logical form may be a representation of a natural language expression. (Logical forms are widely used by database query systems and machine translation systems and are typically forms of first-order logic, with the possible addition of higher-order operators.) The paraphraser is implicitly defined via the BNF description of CLF (Baclis-Naur Forms) of Initial Trees and of the paraphrase rules. The paraphraser uses a technique for mapping logical forms to natural language. The natural language paraphrases which are created could be used either as input to a query system, as part of a machine translation system, or to generate natural language corresponding to an interpretation created by a natural language database query system of a user's query for the purpose of verification of the paraphrase by the user.

14 Claims, 2 Drawing Sheets

METHOD AND APPARATUS FOR PARAPHRASING INFORMATION CONTAINED IN LOGICAL FORMS

CROSS-REFERENCE TO RELATED APPLICATIONS

Our copending EP-application 90850095.2, U.S. Ser. No. 07/485917, filed Feb. 27, 1990, and assigned to the assignee of the present invention, the disclosure of which is incorporated in the present application by reference, discloses an apparatus and a method of analyzing natural language inputs to a computer system for creating queries to data bases. In the process of such an analysis it is desirable to present to the user of the system an interpretation of the created query for verification by the user that the natural language expression has been transformed into a correct query statement.

The system of the referenced application makes use of a conceptual model of the data base in question, and makes use of the model for creating a language independent intermediate form of the input expression. This intermediate form is based on predicate logic.

BACKGROUND OF THE INVENTION (1) Field of the Invention.

The present invention relates to apparatus and methods for paraphrasing information contained in logical forms. In particular, the present invention relates to a computer implemented system for creating natural language paraphrases of information contained in a logical form; more particularly, where the logical form is a representation of a natural language expression, either as an input to a query system or a general natural language expression.

(2) Description of Related Art.

An article entitled "Generating English Paraphrases From Formal Relational Calculus Expressions", by de Roeck et al, (presented at the Conference of Linguistics, 1986), and "A Logical-Form and Knowledge-Base Design for a Natural Language Generation" by Sondheimer, et al, pps. 612–618, (proceedings of the AAAI Conference 1986), respectively, discuss relevant subject matter. The cited articles differ primarily from the present invention in the actual grammar formulization that is applied to the logical forms, and also in what other apparatus might be required. The cited articles use the NIKL and KL-TWO knowledge representation system, as well as a grammar, which produced the input to the grammar, which is a set of relations or constraints, rather than a set of trees, as in the present invention.

SUMMARY OF THE INVENTION

Paraphrasing methods are known, but in general the known paraphrasers are computer programs and must thus be written by skilled programmers. They are not "transportable" between different languages, so that a new paraphraser has to be created for each new natural language.

It would be a great advantage if the paraphrasers were designed in such a way that no or practically no programming skill was required in order to create a functioning one. This is achieved with a paraphraser in accordance with the present invention in that it requires only new grammars to be written, whereas the "frame work", i.e. the generating mechanism is already present.

An object of the invention is a paraphraser which facilitates the preparation of natural language expressions from logical forms by non-programmers, preferably with linguistics skills.

Another object is a paraphraser for translating logical forms into natural language expressions for direct application to a natural language database or machine translation system.

Another object is a method for translating logical forms into syntax trees amenable to grammar rules to provide natural language expressions suitable for direct entry into a natural language database or machine translation system.

A feature of the invention is a generation mechanism, which given a logical form, and an internal representation of a generation grammar, generates natural language expressions, the generation grammar being an internal representation in a symbolic or programming language, for example, Prolog.

Another feature is a paraphraser that accepts logical forms and applies grammar rules to syntax trees as an output, rather than to logical forms.

Another feature is apparatus which accepts conceptual logic forms to generate syntax trees and sentences to which grammar rules are applied to obtain natural language expressions suitable for a natural language database or machine language translation system.

Another feature is a method for forming syntax trees and sentences from conceptual logic forms and subjecting the trees and sentences to grammar rules expressed in a symbolic language for the formation of natural language expressions suitable for application to a natural language database or machine translation system.

Briefly, the paraphraser comprises means for receiving conceptual logic forms (CLF) and in a first step translating the forms into a list of initial syntax trees; in a second step, parsing the initial tree list into sentences or paraphrased derivative, and in a third step evaluating the paraphrased trees by means of an output from a paraphrased grammar translator, which translator expresses the grammar in a symbolic or programming language, for example, Prolog, whereby natural language paraphrases are provided as an output from the paraphraser for application to a natural language database or machine language translation system.

BRIEF DESCRIPTION OF THE DRAWING

FIGS. 1A, 1B and 1C show an overview of a system according to the present invention wherein FIG. 1A is a block diagram which describes apparatus for implementing translations of queries against relational data bases into SQL via conceptual logical form (CLF). FIG. 1B is a block diagram which describes a paraphraser and paraphraser grammar translator which are incorporated into FIG. 1A, and FIG. 1C is a flow diagram of the method of the present invention for paraphrasing queries expressed as CLFs or input to a database query system.

DESCRIPTION OF THE PREFERRED EMBODIMENT

Figure 1A:
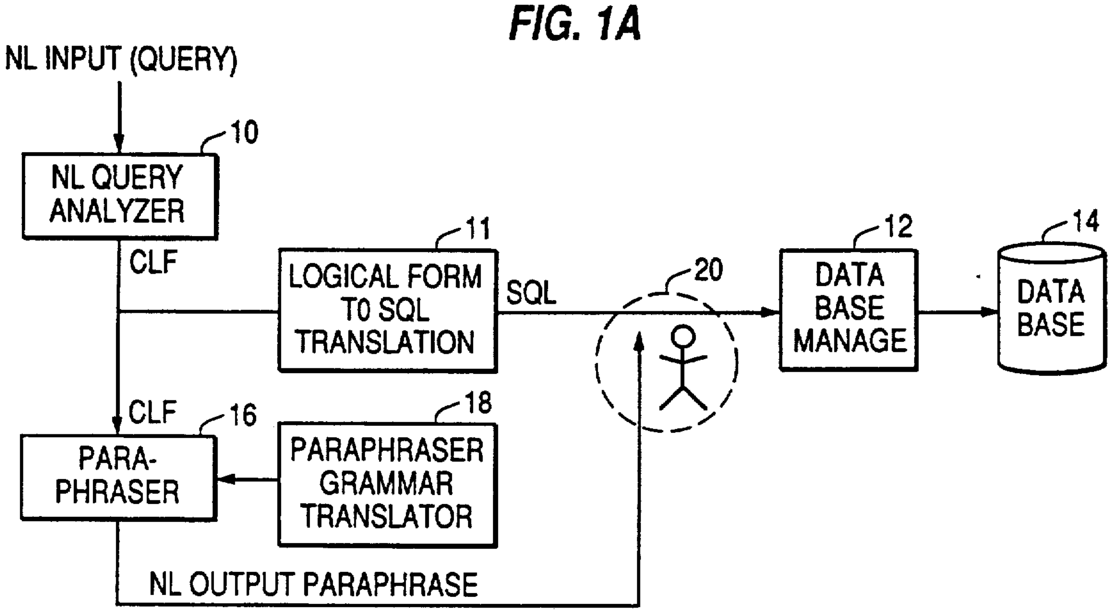

Referring to FIG. 1A, a natural language query generator 10 as described in U.S. Ser. No. 07/485917, filed Feb. 27, 1990, receives a query expressed in natural language and provides a conceptual, logical form of the translation to SQL in a translator 11. The SQL query is transmitted to a database manager which functions with a database 14 to respond to the query. Before such response, the CLF is also supplied to a paraphraser 16, which functions in conjunction with a paraphrase grammar translator 18 to provide a paraphrase output of the CLF for evaluation by an observer 20 as to the correctness of the input to the database manager 12. If the evaluation determines that the paraphrase statement of the CLF is correct, the SQL corresponding to the statement is passed to the database manager 12. In the event the evaluation determines that the CLF is inaccurate as described by the paraphrase output, a revised natural language input to correct for such difference is supplied to the generator 10. A reiteration continues until the CLF and paraphrased output are found to be in agreement by the evaluator.

Figure 1C:
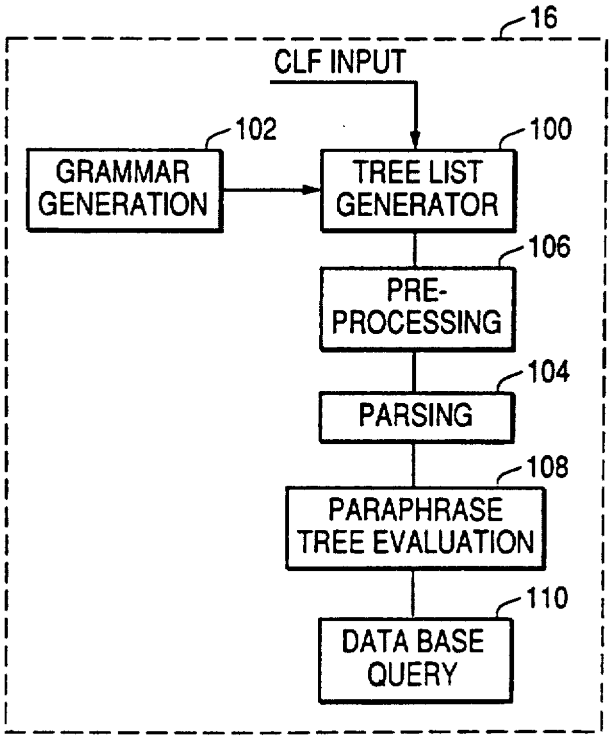
Figure 1B:
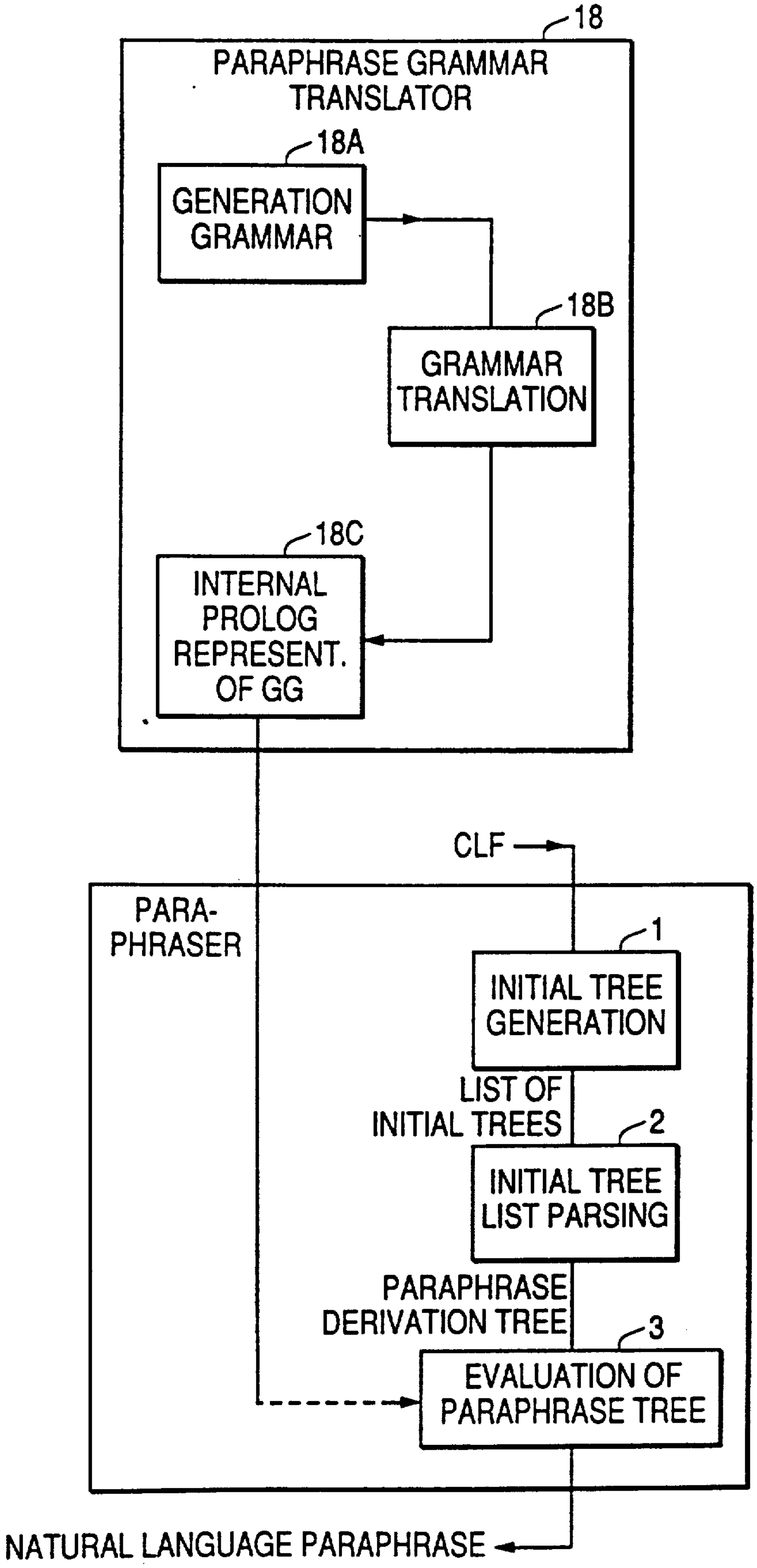

Referring to FIG. 1B, we will describe a natural language generator ("paraphraser") according to the present invention, and which may be used to paraphrase CLF expressions into natural language. CLF, or "conceptual logical form," is an intermediate structure that may be used in the process of generating formal query language expressions. CLF is based on first-order predicate logic, augmented by aggregation functions and a set of commands.

Briefly, in FIG. 1B, the paraphraser 16 receives a CLF statement as an input to a tree generator which maps the logical form to a set of trees (initial trees), the structure and overall content of these trees being used as an input to a parser 2 for natural language analysis. A paraphrase grammar translator 18 comprising a grammar generator 18A, translates 18B the generation grammar into a symbolic language 18C. A paraphrasing mechanism comprising a paraphraser grammar (produced by a grammar translator) and a parser, processes the initial trees in order to build a syntactic tree whereby the initial trees are parsed as an unordered set of complex symbols to provide a paraphrase derivative tree. An evaluation is performed by an observer 20 (see FIG. 1A), typically a human, to determine the correctness and accuracy of the CLF input to the database manager 12 (see FIG. 1A).

The paraphraser is implicitly defined via the BNF-description of CLF, (BNF = Backus-Naur Forms) of the Initial Trees and of the paraphrase rules disclosed in Appendices I, II and III, and a skilled logic programmer would have no difficulty in implementing the invention on the basis of these definitions.

At present the most efficient implementation is achieved by using the Prolog programming language.

The paraphraser uses a technique, described below, for mapping logical forms to natural language. Logical forms are widely used by database query systems and machine translation systems, for example, and are typically forms of first-order logic, with the possible addition of higher-order operators. Such a paraphraser could be used to generate natural language corresponding to an interpretation created by a natural language database query system of a user's query, for the purpose of verification, or as part of a machine translation system.

The logical form is mapped to a set of trees. In structure and overall content these are trees of a sort that might be used as the input to a parser for natural language analysis. That is to say, they have node names which tend to correspond to linguistic categories, such as "noun," "verb," or "adjective" (though there are also more logical-form specific categories), and each tree has a set of syntactic features, that is, pairs of attributes and their values. We will call the trees thus produced "initial trees."

A grammar is applied to the initial trees, which are "parsed" as an unordered set of complex symbols. Each grammar rule is partly a recognition rule and partly a specification of the translation of the node built up by the rule as a function of the translations of its immediate constituents. A particular analysis is successful if and only if a syntactic tree is derived which covers all of the input initial trees, and has a specified top node. Putting aside the fact that the input is unordered, the rules may be thought of as ordinary rewrite rules, allowing feature conditions and feature changes both up and down the tree.

The syntactic tree thus produced is evaluated to create a translation string. That is to say, all initial trees are mapped to (possibly null) natural language strings, as a function of their categories and the features which the grammar and the initial tree generator had placed on them. These translations are incorporated in the translations which are built up according to the generation grammar's rules. That is, the translation of the left-hand-side element(s) specified by the recognition part of a rule is a function of the translations of the right-hand-side (RHS) elements, and the translation.of a RHS element is either specified by the grammar rule which created it, if it is a nonterminal, or by direct evaluation of the tree itself, if it is a terminal, i.e., an initial tree.

Concept-oriented Logical Form is based on First Order Predicate Logic augmented by aggregation functions, queries and commands. It is formulated in terms of the constructs in the conceptual schema, i.e. entities and attributes. Entities are represented as individual constants and attributes as quaternary and quintuple predicates. CLF fulfills the following requirements:

1. It is suitable for all natural languages in the scope of the invention according to the co-pending EP-application 90850095.2, U.S. Ser. No. 07/485917, filed Feb. 27, 1991.
2. It does not depend on particular representations of concepts in a given DB, but caters for all reasonable representations.
3. It is general enough to allow its use in applications beyond DB query for isolated sentences. This refers in particular to enabling extended discourse and DB update.

User-oriented explanation of errors is facilitated by CLF. This regards violation of presuppositions, selectional restrictions, constructions outside the scope of DB query, etc.

CLF Syntax:

Here is an example of a CLF expression.

```
query(report,0,
set(y3,
  instance(e13,y3) &
  exist(y2,
    instance(e56,y2) &
    possesses(y3,y2)))) .
```

The constants "e13" and "e56" are names which have been arbitrarily assigned by the NL query system to particular "entities." An "entity," for present purposes, is a named object in a particular universe of discourse about which some facts have been stated. The entity e13, for example, is known to be associated with the natural language term "country." (Terms such as "country" could not themselves serve as names for entities, of course, since they may be associated with more than one entity; that is, they may have more than one meaning in the given universe of discourse.) For the sake of readability, CLF expressions are usually displayed with terms shown in place of entity names:

```
query(report,0,
set(y3,
  instance(country,y3) &
  exist(y2,
    instance(positive_trade_balance,y2) &
    possesses(y3,y2)))) .
```

The CLF expression given above is paraphrased by the current is paraphrased by the current version of the generator as "Find countries with positive trade balances." More literally, ignoring details, the CLF means something like this: "Find the y3's such that they are instances of the entity e13 ('country') and such that there exists a y2 which is an instance of the entity e56 ('positive_trade_balance'), which y3 'possesses.'" The grammar writer does not need to learn CLF. Code in the paraphraser maps CLF expressions to initial trees, which are the objects the grammar writer is concerned with. The initial trees generated for the CLF are as follows:

```
noun([id = 1,group = 1,scope = [],var = y3,entity =
e13,focus = 1],[])
noun([id = 2,group = 1,scope = [],var = y2,entity =
e56,possessedby = Y3],[])
possesses([id = 3,group = 1,scope = [],leftvar = y3,rightvar =
y2],[])
```

Initial trees consist of a node name (e.g. "noun"), a feature list (e.g. "[id =1, . . . , focus =1]"), and a terminal element ("[]"); in other words, they are syntax trees of the sort one might find in an ordinary analysis grammar. (The terminal element of an initial tree carries no information, however; it is included simply so that syntactic rules may refer to trees in general in a consistent way.)

The features which appear on initial trees will be described in a later section, but it may be useful to discuss some of them briefly now, partly to give the flavor of the mapping from CLF to initial trees, and partly to illustrate what it is that the NL-specific rules in the paraphraser do. Each instance of a quantifier or related operator in the CLF gives rise to a tree which has a "var" feature whose value is the variable the operator binds; for example, "set(y3" is associated here with a noun which is marked "var = y3", and there is similarly a noun with the feature "var = y2". The "y3" noun is also marked "focus =1", signifying that it indicates the thing the query is about. Both y2 and y3 are associated with entities (e13, or "countries," and e56, or "positive trade balances"), and that information is encoded by the use of "entity" features on the appropriate nouns. The CLF relation "possesses(y3,y2)" has been mapped to a tree with features "leftvar = y3, rightvar = y2".

From the standpoint of the grammar writer, it is sufficient to know that "var = y2" and "var = y3" uniquely identify the things the nouns represent, that "focus =1" labels the focus of the sentence to be generated, and that the "possesses" tree indicates that "y3" may be said to possess "y2". Thus what the trees say, apart from their grammatical content, is that we're interested in the "y3'"s which are "e13'"s (countries) and which have "y2'"s which are "e56"s (positive trade balances).

Thc rules which process such trees into translation sentences are described in detail in a later section, but we will discuss one such rule briefly here.

```
rule(250,np(sg := Sg,var := Var2, clause := Clause) →
    np(sg := 0,possessedby = Var2, clause = Clause) &
    possesses(leftvar = Var2, clause = Clause) &
    np(sg = Sg,var = Var2, focus = 1, clause = Clause),
  nil,
  head(3),
  nil,
  nil,
  combine(3,'with',1)).
```

As may be inferred, the first part of rule 250 is essentially a phrase structure rule. It applies to combine the trees on the right-hand side (RHS) of the arrow, constructing a new tree whose top node is the node specified on the left-hand side (LHS) of the arrow, if and only if the "clause" features of all three trees on RHS have the same value (denoted by the variable Var2), if the "possessedby" feature of the first np agrees with the "leftvar" feature of the possesses tree and the "var" feature of the last np, and if the last np is marked "focus =1". If it does apply, the new top node is assigned the feature "sg," whose value will be the same as the value Sg of the final np, and also assigned a feature "var" with the value Var2 and a feature "clause" whose value is the same as the "clause" value of the three RHS trees.

For the sake of simplicity, we will not discuss most of the other parts of the rule until a later section. We do note, however, that the final clause of the rule is a translation rules which specifies how to generate a natural language phrase from the trees on the RHS of the rule. In particular, "combine(3, 'with', 1)" specifies that the translation of the tree constructed by the rule is to be the translation of the third tree, followed by the string "with," followed by the translation of the first tree. It may be seen that this rule could have been stated more directly. There is no reason not to place the np's in the order in which their translations would appear; we have shown the rule in this form simply to illustrate certain properties of the rule formalism.

The translation of the initial trees themselves is accomplished by a separate processor, as a function of the features on the trees. For example, the features "entity = e56, sg =0" would signify that we want the non-singular (plural) form of the term which corresponds to the entity e56, which, in this example, would be the phrase "positive trade balances." It is not up to the grammar writer to actually code such predicates, but s/he may have to specify to programmers how a particular constellation of features is to translated. This will be discussed in a later section.

The translation phrase which rule 250 will generate for the given trees (assuming rules which build up np nodes appropriately) is "countries with positive trade balances." A rule

```
rule(1,top → np(sg := 0),
  nil
  head(1),
  nil,
  nil,
  combine('find',1)).
```

will put the string "find" in front of that translation phrase, producing "find countries with positive trade balances."

In what follows we will discuss the details of initial tree generation, and the possible initial trees, include discussion of the meaning of the features used on the initial trees. We will also discuss the rule formalism in detail.

The model presented allows a grammar writer, skilled in linguistics, but not necessarily skilled in programming, to specify the generation of unambiguous natural language paraphrases from logical forms.

The invention consists of two parts:

A) A generation mechanism, which given a logical form, and an internal representation of a generation grammar, generates natural language.

B) A mechanism that translates a generation grammar into an internal representation in the programming language Prolog, to be used by A.

The model allows a non-programmer, with linguistic knowledge, to write a grammar, much resembling traditional phrase structure grammars for analysis of natural language. The grammar is used for producing unambiguous paraphrases from logical forms. This can for instance be useful in a question-answering system.

Below the generation mechanism will be described with reference to FIG. 1B.

Step 1) Mapping from a logical form to initial trees.

A logical form is necessarily a nested expression, with quantifiers, conjunctions, disjunctions etc. Step 1 (module 1 in the FIGURE) linearizes this nested expression into a list, or actually a set, of linguistic items, like nouns, verbs and adjectives. Associated with each item is a list of features (attribute-value pairs). All information contained in the logical form, including scopings of quantifiers, is preserved via these features. One assumption is that there is a possibility of associating categories like noun etc. with predicates in the logical form, in order to produce these items, or initial trees.

Step 2) From initial trees to a derivation tree.

The list of initial trees can now be parsed (module 2 in the FIGURE), using the generation grammar. If we have a grammar with two rules like:

a → b & c & d.
c → e & f.

and the following set of initial trees is input to step 2:
[e,d,b,f]
then the following happens in the parsing process:

The items "e" and "f" are combined to yield an item of the category "c". The list of items is now [c,d,b].

The items "b", "c" and "d" are combined to yield an item of the category "a". The list of items is now [a], which in this case is the final category.

This process of parsing is different from ordinary parsing with context-free grammars, in that no adjacency or ordering restrictions are specified in the grammar rule. This is necessary because linearization of a logical form does not guarantee any specific, linguistically natural order of the initial trees.

Parsing with this type of grammar is a problem of a very high complexity. Therefore a special mechanism must be used in order to reduce complexity: the rule "cut". The rule cut is specified by the grammar writer for each rule that he/she knows succeeds deterministically, i.e. that the items that made the rule apply will never be used to make another rule apply.

Step 3) From a derivation tree to a natural language paraphrase.

The ordinary derivation tree that was the result of step 2, is traversed top-down, depth-first (module 3 in the FIG. 1*b*), in order to produce for each node in the tree a corresponding natural language string. A noun node might give rise to the string "programmers", and a relative clause node could give "that program in Prolog". If these two were combined together to form a "top", or final, node, the string associated with that top node could be: "List programmers that program in Prolog.". The string associated with the top node is the final paraphrase for the input CLF.

Summarizing, the method of the present invention, as shown in FIG. 1C, comprises the steps of mapping the CLF inputs to a set of initial trees in an operation 100, the structure and overall content of these trees being subject to grammar rules in an operation 102 in order to build a syntactic tree for parsing an unordered set of complex symbols, each grammar rule partly being a phrase structure recognition rule and partly a specification of the translation of the node build-up by the rule as a function of the translations of its immediate constituents, expressed in a symbolic language (to be described below). In operation 104 parses the trees to define node names which tend to correspond to linguistic categories, such as "noun", "verb", or "adjective", with each tree having a set of syntactic features, that have pairs of attributes and values. A preprocessing operation step 106 (to be described hereinafter) may be performed before the parsing operation 104. The operation 106 identifies sets of cluster of trees, the clusters being consistent with each other, in the sense that they do not overlay with all of the trees being required to be in a particular cluster. The output of the operation 104 is a paraphrase derivative tree of the output from the operations 100 and 102. An evaluation operation 108 of the syntactic trees creates translation strings by mapping all initial trees (output from operation 100) to possibly natural language strings, as a function of their categories and the features which the grammar and Tree generation has placed on them, the translation being incorporated in the representations which are built up according to the generation's grammar rules. The output from the operating 108 is supplied as a paraphrase of a natural language query. Essentially, paraphrase grammar translation translates a paraphrase grammar into an internal representation which is used by the paraphrase parser. The translation is a one-time operation. The translation can be compared to the compilation of a program, and the parsing to the running of the program.

Now the mechanism for translating the grammar into a symbolic language, for example a Prolog representation, will be described by way of an example.

The complete BNF for the generation grammar is described in appendices I-III, and the mechanism for performing the translation can easily be implemented by a person skilled in Prolog, to achieve a translator means such as a one shown in an overview in the FIGURE.

Here we will only consider the following example rule: Combining a noun with its name:

```
rule(360,
    cut,
  noun →
  noun(var = Var, group = Group) &
  name(named = Var, constant = Name, group = Group),
    nil,
  head(1),
    insert_features(features_of_1,0),
```

-continued

```
    nil,
      combine(1,'named',2)).
```

This rule will apply when there is a noun tree and a name tree in the set of initial trees, if the "var" feature of the noun, and the "named" feature of the name, have the same value.

The internal Prolog representation of this rule is the following two clauses (with some features removed for the sake of clarity):

```
pg_rule/3
pg_rule(noun([group = V3,focus = V5,id = V6,sg = V7,
        entity = V23,var = V24],
        node(360,V26)),
    [noun([group = V3,focus = V5,id = V6,sg = V7,entity =
        V23,var = V24],
        node(V27,V28)),
    name([= V30,group = V3,named = V24,id = V33],
        node(V34,V35))],
    true) .
eval_gram/2
eval_gram(node(360,V1,V2),V3) ←
  V1 = [group = V6,focus = V8,id = V9,sg = V10,entity =
        V26,var = V27]&
  V2 = [V29,V30] &
  V29 = node(V31,[group = V34,focus = V36,id = V37,sg =
        V38,entity = V54,var = V55],V57) &
  V30 = node(V58,[var = V60,group = V61,named = V63,id =
        V65],V66) &
  dtrs(V57,V67) &
  dtrs(V66,V68) &
  eval_gram(node(V31,[group = V34,focus = V36,id = V37,
        sg = V10,entity = V54,var = V55?,V67),V69) &
  eval_gram(node(V58,[var = V60,group =]V61,named = V63,
    id = V65],V68), V70) &
  combine([head(V69),'named',V70],V3) & / .
```

The pg_rule/3 fact is the actual grammar rule used by the parser (step 2). In this case, all feature manipulations are performed via Prolog unification, without any special feature manipulation predicates. In some cases, such predicates are used —then they occupy the third argument of pg_rule. The first argument corresponds to the left hand side of the generation grammar rule, and the second to the right hand side of the rule.

The eval_gram/2 predicate is used by step 3, to evaluate the derivation tree produced by step 2. This particular clause can only be used to evaluate nodes created by rule number 360, as can be seen from the first argument of the predicate. It recursively evaluates the daughter constituents of the node, and combines the translation of the noun with the translation of the name, inserting the word "named" in between. The output from the combine predicate is the natural language translation of the tree node in question.

A paraphraser built in accordance with the above disclosure is functional, but since the input to the paraphraser rule processor is an unordered set of trees, in the worst case the performance of the paraphraser for a list of trees of length n is proportional to n! ("n factorial"). Thus to improve performance, in a preferred embodiment, the trees are grouped into "clusters" (i.e., the original list of trees is broken down into sublists) before the rule processor operates on them. Each such cluster of trees is processed in turn, effectively enabling the rule processor to do the parsing in stages. Thus, assuming that we have broken a list of initial trees of length n into three sublists, of lengths i, j, and k respectively, instead of a worst-case time proportional to n!, we would have one proportional to i! + j! + k!, which is usually a lot smaller. Thus a list of 12 initial trees unoptimized, would have a worst-case time proportional to 12!, which is 479,001,600. If that list is broken into sublists of lengths 4, 3, and 5, we get 4! + 3! +5! = 150, a difference of a factor of 3,193,344. (In practice, the difference is not nearly this large, but, allowing for the time the clustering itself takes, differences of a factor of 6 to 50 have been noted, about the difference one might observe when a programming language is compiled rather than run interpretatively.)

A "cluster" is a set of trees which is closed under reference, except for exactly one tree N, which is referred to outside the cluster. Every tree that refers to an element of the cluster, or is referred to by an element of the cluster, must be inside the cluster, unless it refers to N. At least one member of the cluster must refer to N, and at least one tree outside the cluster must refer to N. N cannot refer to any tree outside the cluster, though it can refer to trees inside the cluster.

In terms of the features used by the current implementation of the paraphraser, i.e., those appearing on initial trees, it is said that a tree A "refers to" a tree B (or that tree B "is referred to" by tree A) if a. They have the same "group" feature, and either b1. Tree A has one of the following features:
(left_agg_id = X)
(right_agg id = X)
(right_id = X)
and Tree B has one of the following features:
(id = X)
(agg_id = X),
or b2. Tree A has one of the following features:
(acc_var = X)
(comp_var = X)
(dat_var = X)
(date_var = X)
(date_varl = X)
(minute_var = X)
(minute_var1 = X)
(minute_var2 = X)
(month_var = X)
(month_var1 = X)
(month_var2 = X)
(nom_var = X)
(orderby_var = X)
(part_var = X) plus some non-nil "leftid" feature
(prep_var = X)
(right_var = X)
(second_var = X)
(second_var1 = X)
(second_var2 = X)
(time_var = X)
(time_var1 = X)
(time_var2 = X)
(timestamp_var1 = X)
(timestamp_var2 = X)
(year_var = X)
(year_var1 = X)
(year_var2 = X)

b2. Tree B has one of the following feature configurations:
(agg_var = X)
(var = X)
(part_var = X) and no "leftid" feature.

So in processing a treelist according to this optimization, one does the following:

A set of clusters is found. These clusters must be consistent with each other, in the sense that they do not overlap, and all of the trees required to be in a particular cluster by definition must be present. A cluster may contain subclusters, however, a subcluster being a cluster which is properly contained within another cluster.

By the definition used of "cluster," there will be trees which do not appear in any cluster. In particular, according to the definition, no tree with feature (focus =1) may appear in any cluster.

cluster is processed in turn. If a cluster contains a subcluster, then the subcluster is processed first, and then the smallest cluster which contains it. When a cluster A containing such that it is the smallest cluster containing another cluster B is processed, then first B is processed, yielding one or more analyses, and then A is processed.

Each any cluster is processed successfully, the parses which parses which are found for it simply comprise intermediate stages in the derivation. Thus what the clustering strategy does is to determine small groups of trees which it should be legitimate to parse in relative isolation from the larger group of trees.

Finally, the trees not appearing in any cluster are processed. That is, they are given as input to the parser, and an analysis is created which contains both these trees and the trees formed at earlier stages when the clusters were processed.

APPENDIX I

Concept-oriented Logical Form is based on First Order Predicate Logic augmented by aggregation functions, queries and commands. It is formulated in terms of the constructs in the conceptual schema, i.e. entities and attributes. Entities are represented as individual constants and attributes as quaternary and quintuple predicates. CLF fulfills the following requirements:

1. It is suitable for all natural languages in the scope of the invention desclosed in copending EP-application 90850095.2 (IBM Docket SW989001)

2. It does not depend on particular representations of concepts in a given DB, but caters for all reasonable representations.

3. It is general enough to allow its use in applications beyond DB query for isolated sentences. This refers in particular to enabling extended discourse and DB update.

4. User-oriented explanation of errors is facilitated by CLF. This regards violation of presuppositions, selectional restrictions, constructions outside the scope of DB query, etc.

What follows is a BNF description of CLF.

CLFs

```
<clf list>       ::= <clf>.nil!
                        <clf>.<clf list>

<clf>              ::= clf(<sentence number>,<syntactic reading number>,
                           <semantic reading number>,<query list>)
```

Queries

```
<query list>  ::= <query>.nil !
                  <query>.<query list>
<query>       ::= query( <yesno> , <quantified formula>) !
                  query( <yesno> , ^<quantified formula>) !
                  query( <chart spec> , <set>) !
                  query( report , <set>) !
                  <error msg>)

<yesno>       ::= yesno( <doch> , <reverse> )
<doch>        ::= doch ! nodoch
<reverse>     ::= reverse ! noreverse
<chart spec>  ::= chart( <chart type> , <y-axis> , <x-axes> )
<chart type>  ::= bar ! histogram ! line ! pie ! polar !
                  scatter ! surface ! tower ! plot ! radar
<y-axis>      ::= <variable>
<x-axes>      ::= <variable list>
```

Set terms

```
<set>          ::= set( <variable> , <set> )   !
                   set( <variable> , <formula> )

<bag>          ::= bag( <variable> , <formula> )

<range>        ::= range( <lower> , <upper> , <direction> , <bag> )

<lower>        ::= <natural number>
<upper>        ::= <natural number>
```

Formulas

```
<formula>              ::= <predicate>                    !
                           <formula> & <formula>          !
                           <formula> ! <formula>          !
                           <formula> -> <formula>         !
                           <quantified formula>           !
                           ^ <quantified formula>

<quantified formula>   ::= exist( <variable> , <formula> )   !
                           all( <variable> , <formula> )
```

Predicates
Instance

```
<predicate>      ::= instance( <entity> , <variable> )
```

Entities

```
<entity>         ::= e1, ...
<unit>           ::= <entity>
```

Variables

```
<variable>       ::= y1, ...
```

Order

```
<predicate>      ::= order( <variable> , <direction> )

<direction>      ::= asc ! desc
```

Structured entities

```
<predicate>       ::= has_parts( <entity> , <entity list> ,
                                 <variable> , <variable list> )

<variable list>   ::= <variable>.nil !
                      <variable>.<variable list>
```

Name

```
<predicate>       ::= name( <variable> , <string> ) !
                      name( <variable> , <variable> )
```

Identify

```
<predicate>       ::= identify( <variable> , <string> ) !
                      identify( <variable> , <number> ) !
                      identify( <variable> , <variable> )
```

Roles

```
<predicate> ::= <role name> ( <entity> , <entity> ,
                              <governor> , <dependent> )
<predicate> ::= <prepositional role name> ( <preposition> , <entity> ,
                              <entity> , <governor> , <dependent> )
<predicate> ::= attribute( <preposition> , <entity> , <entity> ,
                              <governor> , <dependent> )

<role name>               ::= nom ! acc ! dat ! comp ! gen ! possesses
<prepositional role name> ::= lp ! ls ! lg ! ld ! lv !
                              tp ! ts ! tg ! td ! mod ! cause

<preposition>     ::= <atom>
<governor>        ::= <variable>
<dependent>       ::= <variable>
```

In

```
<predicate>       ::= in( <variable> , <range> )
```

Equality and ordering relations

```
<predicate>       ::= <term> <relational operator> <term>

<relational operator>  ::= = ! ^= ! > ! >= ! =< ! <
```

Terms

```
<term>                 ::= <aggregate term>        !
                           <arithmetic expression> !
                           <function>              !
                           <temporal term>         !
                           <number>                !
                           <string>                !
                           <variable>              !
                           null
```

Aggregation functions

```
<aggregate term>        ::= avg( <bag> )            !
                            max( <bag> )            !
                            min( <bag> )            !
                            sum( <bag> )            !
                            count( <set> )
```

Arithmetic expressions

```
<arithmetic expression> ::=
           <arithmetic term> <arithmetic operator> <arithmetic term> !
           percent( <arithmetic term> , <arithmetic term> )

<arithmetic term>       ::= <aggregate term>        !
                            <arithmetic expression> !
                            <function>              !
                            <temporal term>         !
                            <number>                !
                            <variable>
<arithmetic operator>  ::=  + ! - ! ] ! /
```

Scalar Functions and Time Representation

```
<function> ::=
               duration(<number>,<duration unit>) !
               dimnum(<number>,<unit>).nil !
               dimnum(<variable>,<unit>).nil

<temporal term> ::= <variable> !
                    timestamp(<Year>,<Month>,<Day>,<Hour>,<Min>,<Sec>,<Micro>)
                    timestamp(<date>,<time>) !
                    project( now , <time element> ) !
                    project( <variable> , <time element> ) !
                    now

<time element>  ::= date ! time ! year ! month ! day !
                    hour ! minute ! second ! microsecond
<duration unit> ::= year ! month ! week ! day !
                    hour ! minute ! second ! microsecond

<date>     ::= <variable> !
               date(<YYYY>,<MM>,<DD>) !
               project(now,date)
<time>     ::= <variable> !
               time(<hh>,<mm>,<ss>) !
               project(now,time)

<Year>     ::= <YYYY>   ! ]
<Month>    ::= <MM>     ! ]
<Day>      ::= <DD>     ! ]
<Hour>     ::= <hh>     ! ]
<Min>      ::= <mm>     ! ]
<Sec>      ::= <ss>     ! ]
<Micro>    ::= <Integer between 0 and 999999> ! ]

<YYYY>     ::= <Integer between 1 and 9999>
<MM>       ::= <Integer between 1 and 12>
<DD>       ::= <Integer between 1 and 31>
<hh>       ::= <Integer between 0 and 24>
<mm>       ::= <Integer between 0 and 59>
<ss>       ::= <Integer between 0 and 59>
```

Error Messages

```
<error msg>        ::= msg( <message number> , <fill-in list> )
<message number>   ::= <Integer between 1 and 500>
<fill-in>          ::= <string>
```

Restrictions

The above BNF describes a more general version of CLF than will actually be implemented. Therefore, we need to assert some additional restrictions.

Prohibited CLF fragments

Below is a list of prohibited CLF fragments.

The fragments are expressed by borrowing notation from Prolog, SQL, and CDL.

```
1. Formula1 ! Formula2
     WHERE functor(Formula1) IN nom.acc.dat.comp.gen.nil
     OR    functor(Formula2) IN nom.acc.dat.comp.gen.nil

2. Formula1 -> Formula2
     WHERE functor(Formula1) IN nom.acc.dat.comp.gen.nil
     OR    functor(Formula2) IN nom.acc.dat.comp.gen.nil

LET functor(Structure) BE
  Rule:    Return the functor of structure Structure.
```

The above restrictions can be stated less formally as follows:

1. nom, acc, dat, comp, and gen role predicates may not be or'ed to anything. 2. nom, acc, dat, comp, and gen role predicates may not be combined with anything using ->.

Illustrative Examples

Representation of time

Dates

Individual dates are represented with help of the timestamp function, e.g. timestamp(1988,10,28,•,•,•,•)

Today: is represented by project(now,date). Dates involving computations are represented as arithmetic expressions, as e.g.

y1 = project(now,date) + duration(5,day)

standing for "5 days from today".

Times of day In most cases, where a time of day occurs in a query, a date is added automatically, to obtain a timestamp.

Individual times of day are represented with help of the timestamp function, e.g.

timestamp(•,•,•,17,12,3,•)

Timestamps

Individual timestamps are represented with help of the timestamp function, e.g.

timestamp(1988,10,28,17,12,3,•)

Now: is represented by the special function now

APPENDIX II

BNF-DESCRIPTION OF INITIAL TREES

This section describes the initial, language independent trees used in natural language generation. The aim here is to have another well defined state in between CLF and natural language. The reader should be familiar with the BNF description of CLF before reading this description because some BNF categories have been borrowed from that description.

Each CLF maps to an Initial Tree Structure which contains the semantic information expressed in the CLF (but in a more readily paraphraseable form) and information about the return codes from previous modules in the NLE program sequence and about any previous message output from those modules. And, analogous to the CLF list we have an Initial Trees list:

```
<initial trees list> ::= <initial trees>.nil !
                         <initial trees>.<initial trees list>
<initial trees>      ::= it(<sentence number>,<syntactic reading number>,
                            <semantic reading number>,<itp list>) !
                            <error msg>
<itp list>           ::= <itp>.nil
                         <itp>.<itp list>
<itp>                ::= itp(<rc>,<messages>,<initial tree list>)
```

ITP stands for Initial Tree Packet. The initial tree packet contains return code information, messages information, and initial tree list information corresponding to one subquery of one interpretation for a natural language query.

The initial tree list contains a list of trees which together express the meaning of one subquery of one interpretation of a natural language query, in a form which is ready to be converted into natural language by the application of grammar rules. Each tree is a Prolog structure whose functor indicates the type of tree and whose first argument is a list of features. The second argument is always nil (reserved for later use).

```
<initial tree list>  ::= <initial tree>.nil !
                         <initial tree>.<initial tree list>
```

```
<initial tree>  ::=
    <aggregate term tree>       !
    <antecedent tree>           !
    <arithmetic tree>           !
    <constant tree>             !
    <dimnum tree>               !
    <duration tree>             !
    <has_parts tree>            !
    <identify tree>             !
    <intval tree>               !
    <name tree>                 !
    <or tree>                   !
    <order tree>                !
    <part of speech tree>       !
    <possesses tree>            !
    <preposition tree>          !
    <prepositional role tree>   !
    <query tree>                !
    <range tree>                !
    <relation tree>             !
    <timestamp tree>            !
    <yesno tree>
```

Express aggregation of a variable.

```
<aggregate term tree>      ::=
    noun(<base features>.(aggfunc = <aggregation operator>)
                 .(aggvar = <variable>).nil,nil)
```

Express an implication relationship: Left_tree -> Right_tree.

```
<antecedent tree>          ::=
    antecedent(<base features>.(leftgroup = <id>).(rightgroup = <id>).nil,nil)
```

Express an arithmetic operation.

```
<arithmetic tree>          ::=
    arith(<base features>.(operator = <arithmetic operator>)
                .(<left reference>).(<right reference>).nil,nil)
```

Represent . constant>

```
<constant tree>            ::=
    noun(<base features>.(constant = <constant>).(datatype = <datatype>)
                .nil,nil)
```

Represent a dimensioned number.

```
<dimnum tree>              ::=
    dimnum(<base features>.(constant = <number>).(unit = <entity>).nil,nil) !
    dimnum(<base features>.(var = <variable>).(unit = <entity>).nil,nil)
```

Represent a duration.

```
<duration tree>            ::=
    duration(<base features>.(constant = <number>).
            (duration_unit = <duration unit>).nil,nil)
```

Represent a part of a composite entity. In general, a composite entity will be represented by several such trees; the order of the parts of the composite entity are given by the feature "index," whose values are positive integers 1, 2, 3, ..., n.

```
<has_parts tree>           ::=
    has_parts(<base features>.(var = <variable>).
            (index = <natural number>).nil,nil)
```

Represent the fixing of a variable to a particular value.

```
<identify tree>            ::=
    identify(<base features>.(named = <variable>).<const_or_var feature>
                .nil,nil)
```

Represent an interval.

```
<intval tree>              ::=
    intval(<base features>.<temporal term feature1>.<temporal term feature2>.
            (duration_unit = <duration unit>).nil,nil)
```

Represent the fixing of a variable to a particular value.

```
<name tree>                ::=
    name(<base features>.(named = <variable>).<const_or_var feature>
                .nil,nil)
```

Express an or relationship between two trees.

```
<or tree>                  ::=
    or(<base features>.(leftgroup = <id>).(rightgroup = <id>).nil,nil)
```

Represent a sorting operation on a variable.

```
<order tree>                ::=
    order(<base features>.(orderby = <variable>).(direction = <direction>)
                    .nil,nil)
```

Represent the association of a variable with an entity.

```
<part of speech tree>       ::=
    noun(<base features>.(var = <variable>).(entity = <entity>)
                    .<noun features>,nil)                        !
    verb(<base features>.(var = <variable>).(entity = <entity>)
                    .<verb features>,nil)                        !
    adj(<base features>.(var = <variable>).(entity = <entity>)
                    .<adjective features>,nil)
```

Represent a possession relationship between two variables.

```
<possesses tree>            ::=
    possesses(<base features>.(leftvar = <variable>).(rightvar = <variable>)
                    .nil,nil)
```

Represent a prepositional relationship between two variables.

```
<preposition tree>          ::=
    prep(<base features>.(constant = <preposition>).(leftvar = <variable>)
                    .(rightvar = <variable>).nil,nil)
```

Represent a prepositional role relationship between two variables.

```
<prepositional role tree>   ::=
    prep(<base features>.(role = <role>).(constant = <preposition>)
                    .(leftvar = <variable>).(rightvar = <variable>).nil,nil)
```

Represent the form in which the answer to the query is to be expressed.

```
<query tree>                ::=
    query((id = <id>).<query features>.nil,nil)
```

Represent a sorting and selection operation on a variable.

```
<range tree>                ::=
    range(<base features>.(orderby = <variable>).(direction = <direction>)
                    .(from = <first row>).(to = <last row>).nil,nil)
```

Represent an equality or ordering relation.

```
<relation tree>             ::=
    relation(<base features>.(operator = <relational operator>)
                    .(<left reference>).(<right reference>).nil,nil)
```

Represent time expressions.

```
<timestamp tree>            ::=
    timestamp(<base features>.<time features>.nil,nil)
```

The features for adjectives are the same as for the noun they are associated with (through a variable).

```
<adjective features>    ::=  <noun features>

<aggregation operator>  ::=  avg          !
                             max          !
                             min          !
                             sum          !
                             count

<arithmetic operator>   ::=  +            !
                             -            !
                             ]            !
                             /            !
                             percent

<base features> ::= (id = <id>).(group = <group>).(scope = <scope>)

<chart type>            ::=  bar          !
                             histogram    !
                             line         !
                             pie          !
                             polar        !
                             scatter      !
                             surface      !
                             table        !
                             tower
```

In certain cases the referent of a tree may be either a constant or a variable.

```
<const_or_var_feature>  ::=  constant = <constant> !
                             var = <variable>

<constant>              ::=  <number>     !
                             <string>     !
                             null

<datatype>              ::=  number       !
                             string       !
                             null

<direction>             ::=  asc          !
                             desc
```

Give the unit associated with a duration.

```
<duration unit> ::= years ! months ! weeks ! days !
                    hours ! minutes ! seconds ! microseconds
```

Name the entity associated with a <part of speech tree>.

```
<entity>                ::=  e1, e2, ...

<entity list>           ::=  nil !
                             <entity>.<entity list>
```

<first row> and <last row> are used together to specify a range of elements taken from a sorted list. <first row> refers to the cardinality of the first element to be selected (which in SQL corresponds to a row).

```
<first row>              ::=  <natural number>

<gender>                 ::=  m ! f ! c ! n

<group>                  ::=  <natural number>
```

Each tree is assigned an <id>, as the value of an "id" feature. That <id> is an identifier which is unique within the given set of initial trees.

```
<id>                     ::=  <natural number>
```

<first row> and <last row> are used together to specify a range of elements taken from a sorted list. <last row> refers to the cardinality of the last element to be selected (which in SQL corresponds to a row).

```
<last row>               ::=  <natural number>
```

Some trees are used to express binary relationships between two trees, two variables, or a tree and a variable. <left reference> is used above to indicate that either a tree or a variable may be referred to on the left-hand side of the operator expressing the relationship.

```
<left reference>         ::=  leftid = <id>          !
                              leftvar = <variable>
```

Some features which can be found in many or all kinds of trees are the following:

1. id = Id

Every tree has "id = Id" as the first element of its feature list, where Id is unique. Some trees indicate a relationship between two other trees by referring to Id's.

2. group = Group

Which means that the tree with this feature belongs to a set of trees identified by Group. The "group" feature is used to relate trees which correspond to elements of the CLF occurring together as parts of a disjunction, or as the antecedent or consequent of an implication. For example, given a CLF fragment (A & B) | (C & D & F), the trees which A and B map to will belong to one group, and the trees which C and D and F map to will belong to another group.

3. scope = Variablelist

Which means that the tree in question is "within the scope" of trees whose variables are mentioned in Variablelist, where a tree is said to have a variable in the sense that it has a "variable" feature with a particular value. A tree A is "within the scope" of a tree B in the sense that the quantifier in the CLF that tree A represents is within the scope of the quantifier that tree B represents.

4. subtype_of = Entitylist

Which means that the the entity specified by the tree's "entity" feature is a subtype of the entities in Entitylist. The "subtype_of" feature can be expected, in general, exactly when the tree in question has an "entity" feature, and the entity specified by that feature has a non-null set of supertypes.

Some features which can be found in noun trees (as well as associated adj trees) are the following:

1. focus = 1

Which means that the noun represented (by the tree containing this feature) is what the query asks about.

2. all = 1

Indicates that the variable in question (from the "var = Var" feature) was universally quantified; absence of this feature means that the variable was existentially quantified. Use without the "not = 1" feature means that we are referring to all instances referred to by the variable specified in the "var = Var" feature; use with the "not = 1" feature means that we are referring to some proper subset of all of the instances referred to by the variable specified in the "var = Var" feature.

3. not = 1

Indicates that the quantifier associated with the variable given in the "var = Var" feature has been negated. See "all = 1" for an explanation of the meaning of "not = 1" used in combination with the "all = 1" feature; when not used with the "all = 1" feature this means that the class named by the variable in question has been asserted not to exist. 4. gender = Gender Which means that the term associated with the entity named by the noun's "entity" feature has a certain grammatical gender.

5. gen = Var

Which means that the noun represented (by the tree containing this feature) "possesses" (via genitive case) the noun associated with variable Var.

6. possessedby = Var

Which means that the noun represented (by the tree containing this feature) is "possessed" by the noun associated with variable Var.

```
<noun feature>          ::=  (focus = 1)          !
                             (all = 1)            !
                             (not = 1)            !
                             (gender = <gender>)  !
                             (gen = <variable>)   !
                             (possessedby = <variable>) !
                             (subtype_of = <entity list>)

<noun features>         ::=  nil                              !
                             <noun feature>.<noun features>

<preposition>           ::=  <atom>
```

The <query features> express the form that the answer will take. In the event of a yes/no query, doch and reverse information is given; for chart output, the chart type is given; and when a simple report is desired, this fact is expressed with "report = 1".

```
<query features>        ::=  (doch = <0_or_1>).(reverse = <0_or_1>) !
                             (chart = <chart type>) !
                             (report = 1)

<relational operator>   ::=  =          !
                             ~=         !
                             >          !
                             >=         !
                             <=         !
                             <
```

Some trees are used to express binary relationships between two trees, two variables, or a tree and a variable. <right reference> is used above to indicate that either a tree or a variable may be referred to on the right-hand side of the operator expressing the relationship.

```
<right reference>       ::=  rightid = <id>          !
                             rightvar = <variable>

<scope>                 ::=  <variable list>
```

The intval tree is used to represent intervals. Either part of the interval may be specified by either a variable or a constant, the constant representing a year, month, day, etc. The constants are specified by features similar to <time features>, with suffixes "1" and "2" added to the feature names to determine either the first part or the second part of the interval, respectively. The same is true for variable features.

```
<temporal term feature1> ::=  (year1 = <year>)          !
                              (month1 = <month>)        !
                              (day1 = <day>)            !
                              (hour1 = <hour>)          !
```

```
                                (minute1 = <minute>)        !
                                (second1 = <second>)        !
                                (micro1 = <microsecond>)    !
                                (date2 = <date>)            !
                                (time2 = <time>)            !
                                (yearvar1 = <variable>)     !
                                (monthvar1 = <variable>)    !
                                (dayvar1 = <variable>)      !
                                (hourvar1 = <variable>)     !
                                (minutevar1 = <variable>)   !
                                (secondvar1 = <variable>)   !
                                (datevar1 = <variable>)     !
                                (timevar1 = <variable>)     !
                                (timestampvar1 = <variable>)
<temporal term feature2> ::=    (year2 = <year>)            !
                                (month2 = <month>)          !
                                (day2 = <day>)              !
                                (hour2 = <hour>)            !
                                (minute2 = <minute>)        !
                                (second2 = <second>)        !
                                (micro2 = <microsecond>)    !
                                (date2 = <date>)            !
                                (time2 = <time>)            !
                                (yearvar2 = <variable>)     !
                                (monthvar2 = <variable>)    !
                                (dayvar2 = <variable>)      !
                                (hourvar2 = <variable>)     !
                                (minutevar2 = <variable>)   !
                                (secondvar2 = <variable>)   !
                                (datevar2 = <variable>)     !
                                (timevar2 = <variable>)     !
                                (timestampvar2 = <variable>)
```

The timestamp tree is used to represent time expressions, which may be wholly or partially specified with respect to year, month, day, hour, minute, second, and microsecond. The features used for the timestamp tree are accordingly one or more features representing such time measures, which may be variables. If "date" or "datevar" appears in a feature list, then "year," "month," and "day" and the corresponding variable features will not, and vice versa; similarly for "time"/"timevar" and the features "hour," "minute," and "second." Any of the non-variable features may have the value "current," representing a projection from the CLF term "now," where "now" itself will be represented by features "date = current, time = current."

```
<time features>        ::=  <time feature>
<time features>        ::=  <time feature>.<time features>
<time feature>         ::=  (year = <year>)            !
                            (month = <month>)          !
                            (day = <day>)              !
                            (hour = <hour>)            !
                            (minute = <minute>)        !
                            (second = <second>)        !
                            (micro = <microsecond>)    !
```

```
                     (date = <date>           !
                     (time = <time>           !
                     (yearvar = <variable>)   !
                     (monthvar = <variable>)  !
                     (dayvar = <variable>)    !
                     (hourvar = <variable>)   !
                     (minutevar = <variable>) !
                     (secondvar = <variable>) !
                     (datevar = <variable>)   !
                     (timevar = <variable>)

<unit>          ::=  <entity>
```

Variables represent entities and are used in features to indicate connections between trees. For example, an acc = Var feature indicates a direct object relationship between the verb tree containing the acc = Var feature and the noun tree (and possibly adjective tree) containing a var = Var feature. A variable represents an instance of a particular entity.

```
<variable>          ::=  y1, y2, ...

<variable list>     ::=  nil !
                         <variable>.<variable list>
```

Some features which can be found in verb trees are the following:

1. nom = Var

Which means that the verb represented (by the tree containing this feature) has as its subject the noun associated with variable Var.

2. dat = Var

Which means that the verb represented (by the tree containing this feature) has a dative relationship with the noun associated with variable Var.

3. acc = Var

Which means that the verb represented (by the tree containing this feature) has as its object the noun associated with variable Var.

4. comp = Var

Which means that the verb represented (by the tree containing this feature) has as its complement the noun associated with variable Var.

```
<verb feature>          ::=  (nom = <variable>)    !
                             (dat = <variable>)    !
                             (acc = <variable>)    !
                             (comp = <variable>)   !
                             (subtype_of = <entity list>)
<verb features>         ::=  nil                              !
                             <verb feature>.<verb features>
```

Error Messages:

```
<error msg>         ::= msg( <message number> , <fill-in-list> )
<message number>    ::= <Integer between 1 and 500>
<fill-in-list>      ::= nil ! fill-in.fill-in-list
<fill-in>           ::= string
```

APPENDIX III

PARAPHRASER RULE BNF

```
<BWG> ::= <BWG clause> <BWG>
<BWG> ::= <BWG clause>
```

Declarations for a given set of rules:

```
<BWG clause> ::= head_features ( <feature name list> ) .
<BWG clause> ::= agreement_features ( <feature name list> ) .

<BWG clause> ::= def_feats ( <nodename> , <feature name list> ).
<BWG clause> ::= <nodename> like <nodename>
```

Grammar rules:

```
<BWG clause> ::= <rule>

<rule> ::=
  rule ( <rule identifier> ,
         <pattern> ,
         <conditions>,
         <head declarations>,
         <feature changes> ,
         <combine conditions>,
         <translation> ) .
<rule> ::=
  rule ( <rule identifier> ,
         <rule cut>,
         <pattern> ,
```

```
        <conditions>,
        <head declarations>,
        <feature changes> ,
        <combine conditions>,
        <translation> ) .
<rule identifier> ::= <non-negative integer>
<rule cut> ::= cut
<node nr> ::= <non-negative integer>
<RHS node nr> ::= <positive integer>
<pattern> ::= <LHS> --> <RHS>
<LHS> ::= <node>
<RHS> ::= <node>
<RHS> ::= <node> , <RHS>
<node> ::= <nodename> ( )
<node> ::= <nodename> ( <pseudo-feature list> )
<pseudo-feature list> ::= <pseudo-feature>
<pseudo-feature list> ::= <pseudo-feature> , <pseudo-feature list>
<pseudo-feature> ::= <feature specification> ! <feature assignment>
<feature specification> ::= <fspec>
<feature specification> ::= <fspec neg>
<fspec> ::= <feature name> = <feature value specification>
<fspec neg> ::= ^ <feature name> = <feature value specification>
<feature assignment> ::= <feature name> := <feature value specification
<feature value specification> ::=
                    <Prolog constant> ! <Prolog variable>! <Prolog list
<feature name spec> ::= <Prolog variable> ! <feature name>
<feature names spec> ::= <Prolog variable> ! <feature name list>
<conditions> ::= nil
<conditions> ::= <cbody>
<cbody> ::= <cpredicate>
<cbody> ::= <cbody> & <cbody>
<cbody> ::= <cbody> ! <cbody>
<cbody> ::= ^ <cbody>
<cbody> ::= ( <cbody> )
<cpredicate> ::= exist_feature ( <feature list reference> ,
                                 <feature name spec> )
<cpredicate> ::= value_of_feature ( <feature name spec> ,
                                    <node nr> ,
                                    <term> )
<cpredicate> ::= exists_tree ( <cnode> )   /] Node without assignments
<cpredicate> ::= <term> <infix operator> <term>
<cpredicate> ::= member ( <term> , <feature value specification>)
<infix operator> ::= = ! > ! < ! <= ! >=
<term> ::= <Prolog constant> ! <Prolog variable>
<rule variable> ::= features_of_0, features_of_1, ...
<head declarations> ::= nil
<head declarations> ::= head ( <RHS node nr> )
<head declarations> ::=
  head ( <RHS node nr> ) & <head declarations>
<feature changes> ::= nil
<feature changes> ::= <feature predicate>
<feature changes> ::= <feature predicate> & <feature changes>
<feature predicate> ::= <predicate>
<feature predicate> ::= <feature operation>
<feature predicate> ::= <fcase clause>
<fcase clause> ::= fcase ( <fcases> )
<fcase clause> ::= fcase ( <fcases> ; <otherwise statement> )
<fcases> ::= <fconditional>
<fcases> ::= <fconditional> ; <fcases>
<fconditional> ::= <conditions> -> <fc-assign seq>
<otherwise statement> ::= otherwise -> <fc-assign seq>
<fc-assign seq> ::= <fc-assign> & <fc-assign seq>
```

```
<fc-assign seq> ::= <fc-assign>
<fc-assign> ::= <Prolog variable> := <Term>
<fc-assign> ::=<predicate>
<fc-assign> ::=<feature operation>
<predicate> ::= remove_features ( <feature list reference> ,
                                  <feature names spec> ,
                                  <Prolog variable> )
<predicate> ::= intersect_features ( <feature list reference> ,
                                     <feature list reference> ,
                                     <Prolog variable> )
<predicate> ::= union_features ( <feature list reference> ,
                                 <feature list reference> ,
                                 <Prolog variable> )
<predicate> ::= feature_instances ( <feature names spec> ,
                                    <node nr> ,
                                    <Prolog variable> )
<feature operation> ::=
   insert_features ( <feature list reference> , <node nr> )
<feature operation> ::=
   delete_features ( <feature name list> , <node nr> )
<feature operation> ::=
   replace_features ( <feature list reference> , <node nr> )
<feature list reference> ::= <Prolog variable> ! <rule variable> !
                             <feature specification list>
<feature specification list> ::= <fspec>
<feature specification list> ::= <fspec> , <feature specification list>
<feature name list> ::= <feature name>
<feature name list> ::= <feature name> , <feature name list>
<translation> ::= combine( <translation terms> )
<translation terms> ::= <translation term>
<translation terms> ::= <translation term> , <translation terms>
<translation term> ::= <RHS node nr>
<translation term> ::= <string>
<translation term> ::= <Prolog variable>
<translation term> ::= head_1 ! head_2 ! ...
<translation term> ::= left_of_head_1 ! left_of_head_2 ! ...
<translation term> ::= right_of_head_1 ! right_of_head_2 ! ...
<combine conditions> ::= <combine condition>
<combine conditions> ::= <combine conditions> & <combine condition>
<combine condition> ::= <conditions>
<combine condition> ::= <case clause>
<conditional> ::= <conditions> -> <c-assign seq>
<case clause> ::= case ( <cases> )
<case clause> ::= case ( <cases> ; <otherwise statement> )
<cases> ::= <conditional>
<cases> ::= <conditional> ; <cases>
<otherwise statement> ::= otherwise -> <c-assign seq>
<c-assign seq> ::= <c-assign> & <c-assign seq>
<c-assign seq> ::= <c-assign>
<c-assign> ::= <Prolog variable> := <Term>
```

Although specific embodiments of the invention have been disclosed, it will be understood by those having skill in the art that changes may be made to these embodiments without departing from the spirit and scope of the invention.

What is claimed is:

1. A Method of paraphrasing information contained in logical forms in an information processing system, comprising the steps of:

mapping a logical form expression to a plurality of initial trees, each of said initial trees comprising nodes, said nodes comprising a) node names corresponding to linguistic categories, such as "noun", "verb", or "adjective", and b) a set of syntactic features, that is, pairs of attributes and their values;

applying a grammar to said initial trees, said grammar comprised of grammar rules and each of said grammar rules comprising a phrase structure recognition rule and a generation rule;

said application of said grammar comprising the step of parsing said initial trees as an unordered set by applying said phrase structure rules to said initial trees to create a syntactic tree having a plurality of nodes, one of which is identified as a top node; and creating a paraphrase from said syntactic tree by:

i. selecting each of said nodes of said syntactic tree in order by traversing said syntactic tree, top-down;

ii. if said selected node was created by application of said grammar rules, using said associated generation rule to create translation strings;

iii. if said selected node was an initial tree, creating said translation strings by mapping said initial tree to a natural language string as a function of said initial tree's categories and features which said grammar and said initial tree generator had placed on said initial tree;

iv. combining each of said created translation strings to create translation which is associated with said top node; and v. selecting said translation string associated with said top node as said paraphrase of said syntactic tree.

2. Method as claimed in claim 1, wherein the step of creating said paraphrase comprises, traversing said syntactic tree from node to node, depth-first.

3. Method as claimed in claim 1, wherein the step of creating said paraphrase comprises, traversing said syntactic tree from node to node, breath-first.

4. Method as claimed in claim 1, wherein said natural language paraphrase is displayed.

5. Method as claimed in claim 1, wherein said phrase structure rules allow feature conditions and feature changes both up and down the tree.

6. Method as claimed in claim 5, wherein the step of creating said paraphrase comprises, traversing said syntactic tree from node to node, depth-first.

7. Method as claimed in claim 5, wherein the step of creating said paraphrase comprises, traversing said syntactic tree from node to node, breath-first.

8. Method as claimed in claim 5, wherein said natural language paraphrase is displayed.

9. A Method of paraphrasing information contained in logical forms in an information processing system, comprising the steps of:

mapping a logical form expression to a plurality of initial trees, each of said initial trees comprising nodes, said nodes comprising a) node names corresponding to linguistic categories, such as "noun", "verb",or "adjective", and b) a set of syntactic features, that is, pairs of attributes and their values;

applying a grammar to said initial trees, said grammar comprised of grammar rules and each of said grammar rules comprising a phrase structure recognition rule and a generation rule;

said application of said grammar comprising the steps of:

i. identifying a set of clusters of said initial trees, said set comprised of 1) clusters which are subsets of another cluster of said set; and 2) clusters which do not intersect with another cluster in said set;

ii. parsing each of said clusters comprising parsing said initial trees as an unordered set by applying said phrase structure rules to said initial trees to create a syntactic tree having a plurality of nodes, on eof which is identified as a top node; and creating a paraphrase from said syntactic tree by:

i. selecting each of said nodes of said syntactic tree in order by traversing said syntactic tree, top-down;

ii. if said selected node was created by application of said grammar rules, using said associated generation rule to create translation strings;

iii. if said selected node was an initial tree, creating said translation strings by mapping said initial tree to a natural language string as a function of said initial tree's categories and features which said grammar and said initial tree generator had placed on said initial tree;

iv. combining each of said created translation strings to create a translation string which is associated with said top node; and v. selecting said translation string associated with said top node as said paraphrase of said syntactic tree.

10. Method as claimed in claim 9, wherein the evaluating step comprises, traversing said syntactic tree from node to node, depth-first.

11. Method as claimed in claim 9, wherein the evaluating step comprises, traversing said syntactic tree from node to node, breath-first.

12. Method as claimed in claim 9, wherein said natural language paraphrase is displayed.

13. Apparatus for paraphrasing information contained in logical forms, in an inforamtion processing system said logical forms being typically first-order logic, with possible addition of higher-order operators, the apparatus comprising:

means for mapping the logical forms to a set of initial trees, each of said initial tree comprising nodes, said nodes comprising a) node names corresponding to linguistic categories, such as "noun", or "adjective", and b) a set of syntactic features, that is, pairs of attributes and their values;

means for applying a grammar, said grammar comprised of grammar rules, each of said grammar rules comprising a phrase structure rule and a generation rule;

said means for applying said grammar comprising parsing means for parsing said initial trees as an unordered set using said phrase structure rules, producing a syntactic tree having a plurality of nodes, one of said nodes being identified as a top node;

means for creating a paraphrase from said syntactic tree by selecting each of said nodes of said syntactic tree in order by traversing said syntactic tree, top-down, where said means comprises:

i. means for using said associated generation rule to create translation strings, said means for using applied if said selected node was created by application of said grammar rules;

ii. means for creating said translation strings by mapping said initial tree to a natural language string as a function of said initial tree's categories and features which said grammar and said initial tree generator had placed on said initial tree, said means for creating applied if said selected node was an initial tree;

iii. means for combining each of said created translation strings to create a translation string which is associated with said top node;

iv. means for selecting said translation string associated with said top node as said paraphrase of said syntactic tree; and v. means for displaying said selected translation string.

14. Apparatus for paraphrasing information contained in logical forms, in an information processing system said logical forms being typically first-order logic, with possible addition of higher-order operators, the apparatus comprising:

means for mapping the logical forms to a set of initial trees, each of said initial tree comprising nodes, said nodes comprising a) node names corresponding to linguistic categories, such as "noun", "verb", or "adjective", and b) a set of syntactic features, that is, pairs of attibutes and their values;

means for applying a grammar, said grammar comprised of grammar rules, each of said grammar rules comprising a phrase structure rule and a generation rule;

said means for applying said grammar comprising parsing means for parsing said initial trees as an unordered set using said phrase structure rules, producing a syntactic tree having a plurality of nodes, one of said nodes being identified as a top node;

means for pasing each of said clusters of said set in turn in the following sequence:

selecting a first cluster to be processed;

if the content of said first cluster is the smallest cluster containing a second cluster, then said second cluster is processed first, yielding one or more alalyses;

processing said first cluster;

means for parsing each of said initial trees in said clusters as an unordered set by applying said phrase structure rules to said initial trees to create a syntactic tree having a plurality of nodes, one of said nodes being identified as a top node;

means for evaluating said syntactic tree, said evaluation performed by selecting each of said nodes of said syntactic tree in order;

means for creating a paraphrase from said syntactic tree by selecting each of said nodes of said syntactic tree in order by traversing said syntactic tree, top-down, where said means comprises:

i. means for using said associated generation rule to create translation strings, said means for using applied if said selected node was created by application of said grammar rules;

ii. means for creating said translation strings by mapping said initial tree to a natural language string as a function of said initial tree's categories and features which said grammar and said initial tree generator had placed on said initial tree, said means for creating applied if said selected node was an initial tree;

iii. means for combining each of said created translation strings to create a traslation string which is associated with said top node;

iv. means for selecting said translation string associated with said top node as said paraphrase of said syntactic tree; and v. means for displaying said selected translation string.

* * * * *